(12) United States Patent
Dobisz et al.

(10) Patent No.: US 7,085,110 B2
(45) Date of Patent: Aug. 1, 2006

(54) THERMALLY STABLE OXIDIZED BIAS LAYER STRUCTURE FOR MAGNETORESISTIVE MAGNETIC HEAD FOR A HARD DISK DRIVE

(75) Inventors: Elizabeth Ann Dobisz, San Jose, CA (US); James Mac Freitag, San Jose, CA (US); Mustafa Michael Pinarbasi, Morgan Hill, CA (US); Patrick Rush Webb, Los Gatos, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 254 days.

(21) Appl. No.: 10/615,554

(22) Filed: Jul. 7, 2003

(65) Prior Publication Data

US 2005/0007705 A1 Jan. 13, 2005

(51) Int. Cl.
*G11B 5/33* (2006.01)
(52) U.S. Cl. ................................. 360/324.1
(58) Field of Classification Search ............ 360/324.1, 360/324.12, 324.2, 322, 327.1, 327.2, 327.23, 360/327.3, 327.32
See application file for complete search history.

(56) References Cited

U.S. PATENT DOCUMENTS

| | | | |
|---|---|---|---|
| 5,668,685 A * | 9/1997 | Soeya et al. ............ 360/327.32 |
| 6,338,899 B1 | 1/2002 | Fukuzawa et al. .......... 428/332 |
| 6,381,107 B1 * | 4/2002 | Redon et al. ............ 360/324.2 |
| 6,452,385 B1 | 9/2002 | Shimazawa et al. ........ 324/252 |
| 6,466,418 B1 | 10/2002 | Horng et al. .......... 360/324.12 |
| 6,778,364 B1 * | 8/2004 | Dobisz et al. .......... 360/324.12 |
| 2001/0006444 A1 | 7/2001 | Hayakawa et al. ....... 360/324.1 |
| 2002/0097534 A1 | 7/2002 | Sun et al. ................. 360/324.2 |
| 2003/0179517 A1 * | 9/2003 | Horng et al. .......... 360/324.12 |
| 2004/0027731 A1 * | 2/2004 | Hasegawa et al. .......... 360/322 |
| 2004/0090718 A1 * | 5/2004 | Gill ....................... 360/324.12 |
| 2004/0160708 A1 * | 8/2004 | Zheng et al. .......... 360/324.12 |
| 2004/0179312 A1 * | 9/2004 | Freitag et al. ......... 360/324.12 |

* cited by examiner

*Primary Examiner*—Tianjie Chen
(74) *Attorney, Agent, or Firm*—Robert O. Guillot; Intellectual Property Law Offices

(57) ABSTRACT

The magnetic head of the present invention includes a magnetoresistive read head element in which a magnetic bias layer is deposited across the surface of the wafer above the free magnetic layer. Central portions of the biasing layer that correspond to the read head track width are oxidized to essentially remove the magnetic moment of the bias layer material in those central locations. An oxygen diffusion barrier layer is then deposited upon the oxidized central portions of the biasing layer to prevent diffusion or migration of oxygen from the oxidized central regions of the biasing layer. An insulation layer, a second magnetic shield layer and further structures of the magnetic head are subsequently fabricated.

22 Claims, 2 Drawing Sheets

THERMALLY STABLE OXIDIZED BIAS LAYER STRUCTURE FOR MAGNETORESISTIVE MAGNETIC HEAD FOR A HARD DISK DRIVE

BACKGROUND OF THE INVENTION

1. Field of the Invention

The present invention relates generally to magnetic heads for hard disk drives, and more particularly to magnetoresistive read head elements of such magnetic heads.

2. Description of the Prior Art

A typical prior art read head portion of a magnetic head for a hard disk drive includes a plurality of thin film layers that are deposited and fabricated to produce a magnetoresistive read head sensor, as is known to those skilled in the art. In the typical fabrication process of this prior art read head, a plurality of sensor layers are first deposited across the surface of a wafer substrate. A photoresist mask is then applied to mask the read sensor layers in a central read head region for defining a read head sensor width. The unmasked sensor layers in side regions are then removed by ion milling. A magnetic bias layer stack, including electrical leads, is then deposited at the sensor edges in the unmasked side regions. The central photoresist mask is subsequently removed and an insulation layer, a magnetic shield layer and further layers and structures are then fabricated to complete the magnetic head. Due to shadowing effects of the mask and other problems in depositing the bias layers, it can be difficult to reliably achieve a designed read head sensor width, and inconsistent sensor quality can result.

Recently, a read head element has been developed where the masking and ion milling step is eliminated. In this read head design, the magnetic bias layers are deposited across the surface of the wafer on top of the read head sensor layers. A central portion of the bias layer is oxidized to remove its magnetic moment, where the outer portions of the bias layer are masked, and therefore are not oxidized. The outer, non-oxidized portions of the bias layer then provide a desired magnetic bias to the sensor layers, whereas the central, oxidized portion of the bias layer provides no biasing effect to the sensor layers disposed beneath it. As a result, the read head sensor layers in the central region remain sensitive to magnetic fields from data bits on a hard disk, whereas the outer portions of the sensor layers are desirably biased by the non-oxidized portions of the bias layers that are deposited upon them.

A problem that has developed with the recently developed read head element described above is that the oxygen within the oxidized central portion of the bias layer has been found to migrate or diffuse into adjacent layers, such as the insulation layer fabricated above it, when the magnetic head is subsequently heated for annealing purposes in subsequent magnetic head fabrication steps.

SUMMARY OF THE INVENTION

The magnetic head of the present invention includes a giant magnetoresistive read head element in which a magnetic bias layer is deposited across the surface of the wafer above the free magnetic layer. Central portions of the biasing layer that correspond to the read head track width are oxidized to essentially remove the magnetic moment of the bias layer material in those central locations. An oxygen diffusion barrier layer is then deposited upon the oxidized central portions of the biasing layer to prevent diffusion or migration of oxygen from the oxidized central regions of the biasing layer. An insulation layer, a second magnetic shield layer and further structures of the magnetic head are subsequently fabricated.

It is an advantage of the magnetic head of the present invention that the magnetic bias layer is deposited across the free magnetic layer.

It is another advantage of the magnetic head of the present invention that a magnetic bias layer having a stable, oxidized central portion is formed across the free magnetic layer.

It is a further advantage of the magnetic head of the present invention that a magnetic bias layer is deposited across the free magnetic layer, where an oxygen diffusion barrier layer is deposited across an oxidized central portion of the bias layer to prevent oxygen migration or diffusion.

It is yet another advantage of the magnetic head of the present invention that an oxygen barrier layer having minimal electrical conductivity is deposited upon an oxidized central portion of a magnetic bias layer.

It is an advantage of the hard disk drive of the present invention that it includes a magnetic head of the present invention wherein the magnetic bias layer is deposited across the free magnetic layer.

It is another advantage of the hard disk drive of the present invention that it includes a magnetic head of the present invention wherein, a magnetic bias layer having a stable, oxidized central portion is formed across the free magnetic layer.

It is a further advantage of the hard disk drive of the present invention that it includes a magnetic head of the present invention wherein a magnetic bias layer is deposited across the free magnetic layer, where an oxygen diffusion barrier layer is deposited across an oxidized central portion of the bias layer to prevent oxygen migration or diffusion.

It is yet another advantage of the hard disk drive of the present invention that it includes a magnetic head of the present invention wherein an oxygen barrier layer having minimal electrical conductivity is deposited upon an oxidized central portion of a magnetic bias layer.

It is an advantage of the magnetic head fabrication method of the present invention that a magnetic bias layer having an oxidized central portion is deposited across the surface of the wafer substrate upon a free magnetic layer.

It is another advantage of the magnetic head fabrication process of the present invention that oxygen diffusion from an oxidized central region of a magnetic bias layer is substantially eliminated by the deposition of an oxygen diffusion barrier layer thereupon.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
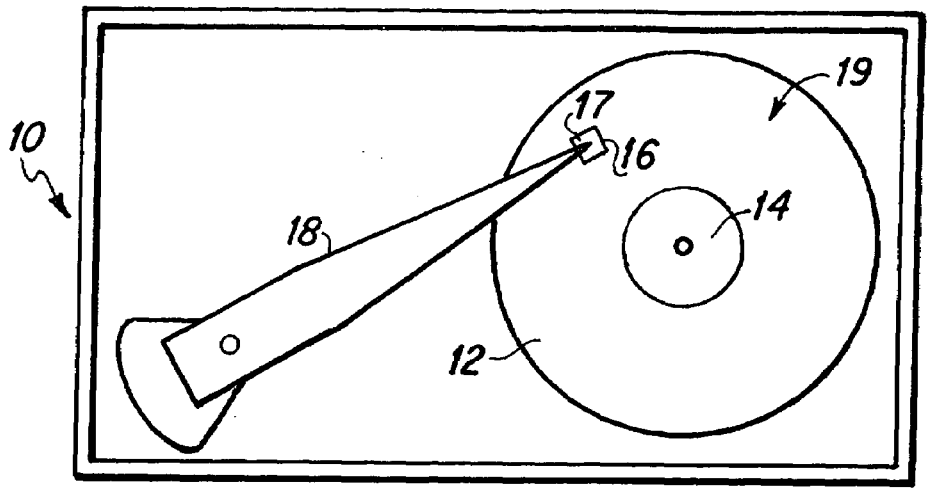
FIG. 1 is a schematic top plan view of a hard disk drive including the magnetic head of the present invention.

The magnetic head of the present invention is utilized to read and write data to magnetic media, such as a hard disk in a hard disk drive. A simplified top plan view of a hard disk drive 10 is presented in FIG. 1, wherein at least one magnetic media hard disk 12 is rotatably mounted upon a spindle 14. A magnetic head 16 of the present invention is formed upon a slider 17 that is mounted upon an actuator arm 18 to fly above the surface 19 of each rotating hard disk 12, as is well known to those skilled in the art. A typical hard disk drive 10 may include a plurality of disks 12 that are rotatably mounted upon the spindle 14, and a plurality of actuator arms 18, each having at least one slider 17 with a magnetic head 16 that are mounted upon the distal end of the actuator arms 18. As is well known to those skilled in the art, when the hard disk drive 10 is operated, the hard disk 12 rotates upon the spindle 14 and the slider acts as an air bearing in flying above the surface of the rotating disk. The slider 17 includes a substrate base upon which various layers and structures that form the magnetic head are fabricated. Such heads are fabricated in large quantities upon a wafer substrate and subsequently sliced into discrete magnetic heads 16.

Figure 2:
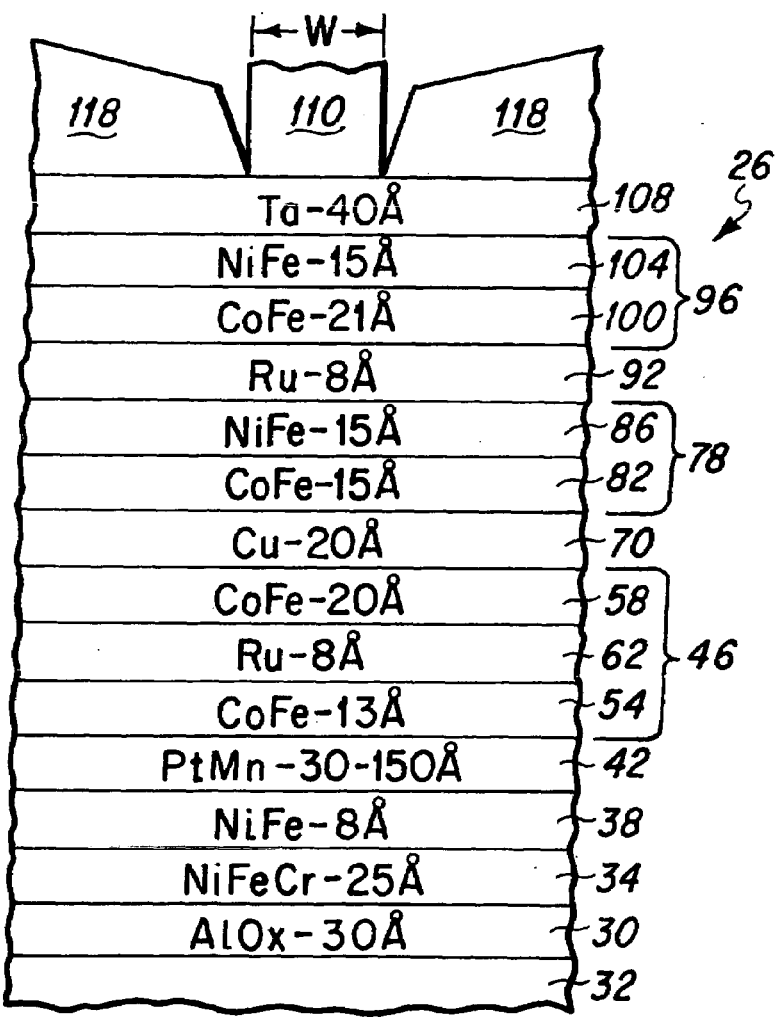
FIG. 2 is a cross sectional view taken from an air bearing surface (ABS) viewpoint of a read head element of a magnetic head as fabricated on a wafer substrate.

FIG. 2 is a cross sectional view taken from an air bearing surface (ABS) viewpoint of a magnetic head that is fabricated upon a wafer substrate for ultimate use as a slider 17 in a disk drive 10 as depicted in FIG. 1. The read head element 26 of the magnetic head may include an alumina layer 30 that is deposited upon the substrate base 32 of the wafer. Thereafter, a pre-seed layer 34 which may be comprised of NiFeCr is deposited, followed by seed layer 38 which may be comprised of NiFe and an antiferromagnetic layer 42 which may be comprised of a material such as PtMn. A pinned magnetic layer 46 may next be fabricated upon the antiferromagnetic layer 42. In the embodiment depicted in FIG. 2, the pinned magnetic layer 46 is a multilayer structure that includes a first magnetic layer 54 which may be comprised of a material such as CoFe, and a second magnetic layer 58, which may be comprised of CoFe, that are separated by a thin spacer layer 62 that may be comprised of ruthenium. This pinned magnetic layer structure 46 is formed as an antiparallel coupled layer structure, as is known to those skilled in the art.

A spacer layer 70 which may be comprised of copper, is next fabricated upon the pinned magnetic layer structure 46 and a free magnetic layer 78 is next fabricated upon the spacer layer 70. In the embodiment depicted in FIG. 2, the free magnetic layer 78 is a multilayer structure that is comprised of two layers, including a first magnetic layer 82 which may be comprised of CoFe and a second magnetic layer 86 which may be comprised of NiFe.

A magnetic bias layer structure is next fabricated upon the free magnetic layer 78. In the magnetic head depicted in FIG. 2, the magnetic bias layer structure is fabricated by the creation of an antiparallel coupled magnetic layer on top of the free magnetic layer 78. Specifically, a thin spacer layer 92 is deposited across the wafer surface on top of the free magnetic layer 78, and a magnetic bias layer 96 is deposited across the wafer on top of the thin spacer layer 92. In the embodiment depicted in FIG. 2, the thin spacer layer 92 may be comprised of a material such as ruthenium, and the bias layer 96 is a multilayer structure that includes a first magnetic biasing layer 100 which may be comprised CoFe and a second magnetic biasing layer 104 which may be comprised of NiFe. The bias layer 96 is antiparallel coupled to the free magnetic layer 78 through the Ru spacer layer 92, in a manner that is well known to those skilled in the art. It is preferable though not necessary that the magnetic layers 100 and/or 104 of the bias layer 96 are somewhat thicker than the layers 82 and/or 86 of the free magnetic layer 78, such that a cumulative biasing magnetic field will be created within the antiparallel coupled layers 78 and 96. A cap layer 108 that is preferably comprised of Ta is next deposited across the surface of the wafer on top of the bias layer 96.

Following the fabrication of the cap layer 108, a mask is fabricated, such as by using photolithographic techniques, wherein masking elements 110 are deposited at the designated wafer locations of the read head elements within the magnetic heads. The masking elements 110 are fabricated with a width W that will correspond to the read head track width of the read head elements. Following the fabrication of the masking elements 110, electrical lead traces 118 are fabricated upon the cap layer 108 in unmasked areas across the wafer. It is to be understood that the compositions and thicknesses of the layers set forth in FIG. 2 are intended to be exemplary of an embodiment of the present invention, and are not meant to be limiting as far as the scope of the invention described herein.

As will be understood by those skilled in the art, for a magnetoresistive read head element to operate properly, the free magnetic layer must have a magnetization that is free to rotate in response to the magnetic field of the data bits that are written into the hard disk 12 of the disk drive 10. Furthermore, with reference to FIG. 2, where the free magnetic layer 78 is antiparallel coupled to the bias layer 96, the magnetization of the free magnetic layer will not be free to rotate.

Figure 3:
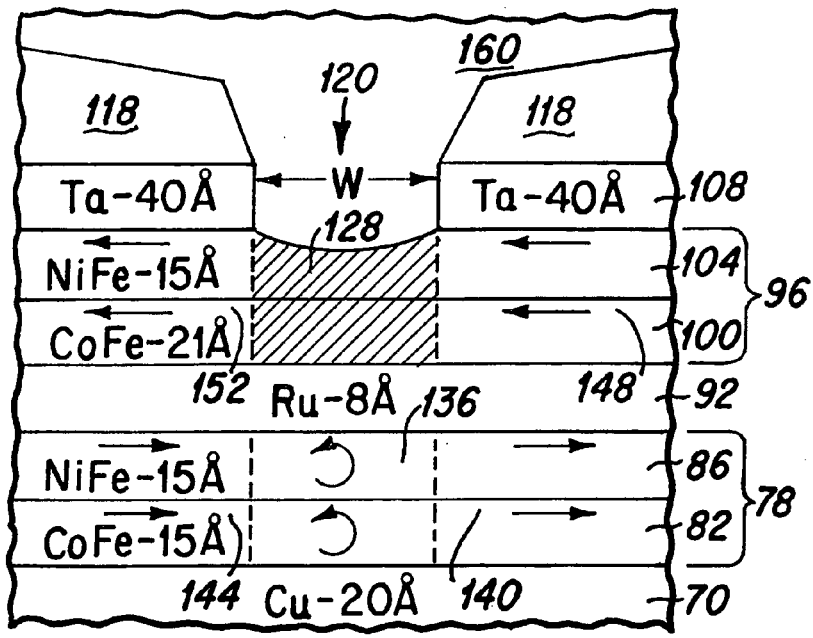
FIG. 3 is a cross sectional view depicting further fabrication steps of the magnetic head depicted in FIG. 2.

FIG. 3 is a cross sectional view of the read head element depicted in FIG. 2 wherein further fabrication steps are shown. With reference to FIG. 3, following the fabrication of the electrical lead traces 118, the resist mask 110 is removed such that the central portion 120 of the read head element having a width W is exposed. To achieve a desired free magnetization within the free magnetic layer, an ion etching process, which may preferably be a reactive ion etching process is performed upon the wafer in which the Ta cap 108 in the central portion 120 is removed. Then the central portion of the bias layer 96 is oxidized (shown as shaded 128), such as by the exposure of the wafer to a low energy oxygen ion plasma, such as may be generated by a low energy reactive ion etch (RIE) oxygen plasma system. As depicted in FIG. 3, because the bias layer 96 is only exposed in the central read head area 120, the oxidized bias layer area 128 is only formed in that central area having a width W. Significantly, as will be understood by those skilled in the art, when the magnetic layers of the bias layer 96 are oxidized, the magnetic moment of the materials comprising the bias layer is essentially removed, such that the magnetic moment of the central portion 128 of the bias layer 96 is approximately zero. Additionally, the thin spacer layer 92 is preferably comprised of a material that does not readily oxidize (such as Ru), such that the thin spacer layer 92 acts as a lower barrier layer to oxygen diffusion, whereby the free magnetic layer in the central area 136 below the oxidized bias layer area 128 is not oxidized. Finally, it is to be understood that the magnetic fields within the outer portions 140 and 144 of the free magnetic layer 78 remain antiparallel coupled with the magnetic fields within the outer portions 148 and 152 respectively of the bias layer 96, such that the magnetization within the outer portions 140 and 144 of the free magnetic layer 78 is not free to rotate. Therefore while the bias layer 96 is deposited across the central portion 136 of the free magnetic layer, because the central portion 128 of the bias layer 96 has been oxidized, such that its magnetic moment has been essentially removed, the magnetization within the central portion 136 of the free magnetic layer 78 is free to rotate, as is desired. The magnetic head depicted in FIG. 3 therefore achieves the desired result that the magnetically sensitive portion of the free magnetic layer is the central portion 136 that corresponds to the read track width W of the magnetic head. Thereafter, following the oxidation of the central portion 128 of the bias layer 96, an insulation layer (G2) 160 is deposited across the surface of the wafer. Further magnetic head structures, such as a second magnetic shield layer and write head structures and components may thereafter be fabricated, as are well known to those skilled in the art.

A problem that has developed with magnetic heads of the type depicted in FIG. 3 is that the oxidized central bias layer portion 128 is not completely stable during subsequent thermal cycling and annealing processes that are undertaken at various points in the magnetic head fabrication process. Specifically, it has been determined that a portion of the oxidizing oxygen within the central portion 128 of the bias layer can diffuse or migrate into the alumina G2 insulation layer 160. When this occurs, the central portion 128 of the bias layer 96 will regain some of its magnetic moment, resulting in some pinning of the free magnetic field within the central portion 136 of the free magnetic layer 78. This affects the operational qualities of the magnetic head and can render it inoperable. A solution to this problem is depicted in FIG. 4 and next described.

Figure 4:
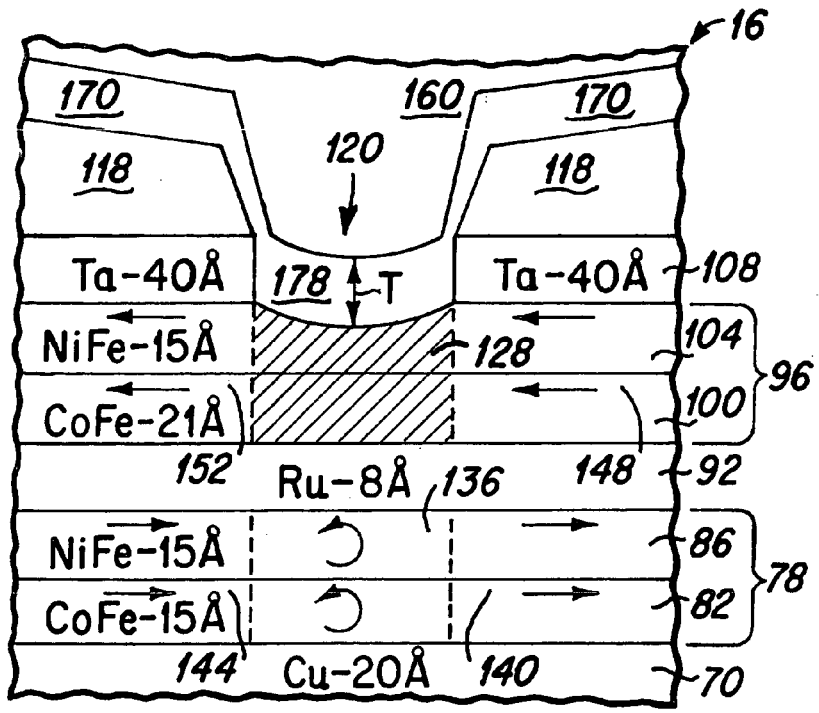
FIG. 4 is a cross sectional view of the improved magnetic head of the present invention.

FIG. 4 is a cross sectional view of the magnetic head 16 of the present invention as depicted in FIG. 3 with the improvements next described. As depicted in FIG. 4, following the oxidation step described hereabove, in which the central portion 128 of the bias layer is oxidized, a thin barrier layer 170 is deposited across the surface of the wafer such as by using a sputter deposition process. The barrier layer 170 is preferably comprised of a material having a significant resistance to oxidation and a low electrical conductivity. Materials such as ruthenium and rhodium are suitable for the barrier layer 170, and ruthenium is more desirable than rhodium in that it has a lower electrical conductivity. As can be seen in FIG. 4, the barrier layer 170 is particularly deposited across the central portion 128 of the bias layer 96 with the specific purpose of forming a barrier portion 178 within the central region 120 of the head, on top of the oxidized central portion 128 of the bias layer structure 96. It is desirable that the barrier layer 178 be fabricated within a thickness T that is sufficient to form an oxygen diffusion barrier, yet be as thin as it can be to limit electrical shunting through the layer 170 between the electrical leads 118. In the preferred embodiment, the barrier layer is comprised of ruthenium having a thickness of approximately 5 Å to approximately 40 Å, with a preferred thickness of approximately 20 Å.

Figure 5:
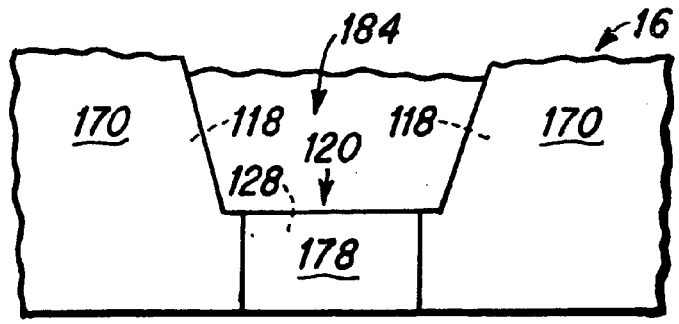
FIG. 5 is top plan view of the magnetic head depicted in FIG. 4.

Following the deposition of the barrier layer 170, it is desirable to remove portions of the barrier layer 170 that are deposited in head regions that are between the electrical leads and away from the central area 120 of the head. Specifically, FIG. 5 is a top plan view of the magnetic head depicted in FIG. 4, showing the barrier layer 170 as deposited on top of the electrical leads 118. Significantly, the barrier layer 170 has been removed in the area 184 between the electrical leads 118, whereas the central barrier layer portion 178 is retained on top of the oxidized portion 128 of the bias layer 96. A photolithographic masking and ion etching process may be used to remove the unwanted portions of the barrier layer in the area 184 between the leads 118. It is acceptable for the portions of the barrier layer 170 that are deposited on top of the electrical leads 118 to remain within the magnetic head as they do not interfere with the electrical conductivity of the electrical leads nor increase the shunting of the electrical current through the central portion 178 of the barrier layer. Following the removal of the unwanted portions of the barrier layer in the area 184 as depicted in FIG. 5, the G2 insulation layer 160 is deposited across the surface of the wafer. Subsequent magnetic head structures, such as the second magnetic shield and write head components are subsequently be fabricated, as is well known to those skilled in the art.

A desirable feature of the magnetic head 16 of the present invention is that the magnetic biasing layer structure is fabricated as layers that are deposited across the surface of the wafer, where the bias layer structure is deposited in a manner to create an antiparallel coupled biasing structure with the outer portions of the free magnetic layer. The central portion of the biasing layer structure is oxidized to remove its magnetic moment, such that the magnetization within the central portion of the free magnetic layer is free to rotate in response to data bit magnetic fields from the hard disk. The oxygen diffusion barrier layer is deposited on top of the oxidized bias layer central portion to prevent the diffusion of oxygen from the bias layer. The magnetic head therefore retains its desirable free magnetic layer properties during subsequent thermal cycling and other fabrication steps that are undertaken during the magnetic head fabrication process.

While the present invention has been shown and described with regard to certain preferred embodiments, it is to be understood that modifications in form and detail will no doubt be developed by those skilled in the art upon reviewing this disclosure. For instance, the seed layers, antiferromagnetic layer, pinned magnetic layer, spacer layer and free magnetic layer, as depicted in FIG. 2, may be comprised of structures and compositions that differ from those depicted and described herein. The deposition of the biasing layer across the wafer surface and the oxidation of the central portion of the biasing layer are significant features. The fabrication of the barrier layer to prevent diffusion of the oxygen from the central portion of the biasing layer is an important feature of the present invention that improves device performance. It is therefore intended that the following claims cover all such alterations and modifications that nevertheless include the true spirit and scope of the inventive features of the present invention.

We claim:

1. A magnetic head including a read head element, comprising:
  a pinned magnetic layer;
  a free magnetic layer having a central portion thereof having a free magnetization therewithin;
  a magnetic bias layer, including a central portion thereof that is disposed across said central portion of said free magnetic layer;
  said central portion of said bias layer being comprised of a material having an approximately zero magnetic moment;
  a pair of electrical leads being disposed above said bias layer and on opposite sides of said central portion of said bias layer;
  a barrier layer being disposed across said central portion of said bias layer and upon said electrical leads, wherein said barrier layer is not disposed between said electrical leads except in said locations of across said central portion of said bias layer and upon said electrical leads.

2. A magnetic head as described in claim 1 wherein said central portion of said bias layer is comprised of an oxidized material, and said barrier layer is comprised of a material that is a barrier to oxygen diffusion from said central portion of said bias layer.

3. A magnetic head as described in claim 2, further including a thin spacer layer that is disposed upon said free magnetic layer, wherein said bias layer is disposed upon said thin spacer layer and said barrier layer is deposed upon said bias layer.

4. A magnetic head as described in claim 3 wherein said barrier layer is comprised of a material that has low electrical conductivity.

5. A magnetic head as described in claim 4 wherein said barrier layer is comprised of Ru or Rh.

6. A magnetic head as described in claim 5 wherein said barrier layer is comprised of Ru having a thickness of from approximately 5 Å to approximately 40 Å.

7. A magnetic head as described in claim 6 wherein said barrier layer has a thickness of approximately 20 Å.

8. A magnetic head as described in claim 3 wherein said thin spacer layer is comprised of a material that is a barrier to oxygen diffusion.

9. A magnetic head as described in claim 8 wherein said thin spacer layer is comprised of Ru.

10. A hard disk drive including a magnetic head including a read head element, comprising:
    a pinned magnetic layer;
    a free magnetic layer having a central portion thereof having a free magnetization therewithin;
    a magnetic bias layer, including a central portion thereof that is disposed across said central portion of said free magnetic layer;
    said central portion of said bias layer being comprised of a material having an approximately zero magnetic moment;
    a pair of electrical leads being disposed above said bias layer and on opposite sides of said central portion of said bias layer;
    a barrier layer being disposed across said central portion of said bias layer and upon said electrical leads, wherein said barrier layer is not disposed between said electrical leads except in said locations of across said central portion of said bias layer and upon said electrical leads.

11. A magnetic head as described in claim 10 wherein said central portion of said bias layer is comprised of an oxidized material, and said barrier layer is comprised of a material that is a barrier to oxygen diffusion from said central portion of said bias layer.

12. A magnetic head as described in claim 11, further including a thin spacer layer that is disposed upon said free magnetic layer, wherein said bias layer is disposed upon said thin spacer layer and said barrier layer is deposed upon said bias layer.

13. A magnetic head as described in claim 12 wherein said barrier layer is comprised of a material that has low electrical conductivity.

14. A magnetic head as described in claim 13 wherein said barrier layer is comprised of Ru or Rh.

15. A magnetic head as described in claim 14 wherein said barrier layer is comprised of Ru having a thickness of from approximately 5 Å to approximately 40 Å.

16. A magnetic head as described in claim 15 wherein said barrier layer has a thickness of approximately 20 Å.

17. A magnetic head as described in claim 12 wherein said thin spacer layer is comprised of a material that is a barrier to oxygen diffusion.

18. A magnetic head as described in claim 17 wherein said thin spacer layer is comprised of Ru.

19. A method for fabricating a magnetic head, comprising:
    fabricating a free magnetic layer;
    fabricating a magnetic bias layer across said free magnetic layer;
    fabricating electrical leads above portions of said bias layer;
    oxidizing a central portion of said bias layer;
    depositing an oxygen diffusion barrier layer upon said oxidized central portion of said bias layer and upon said electrical leads; and
    removing portions of said barrier layer that are deposited at locations other than upon said electrical leads and upon said central portions of said bias layer.

20. A method for fabricating a magnetic head as described in claim 19 wherein said barrier layer is comprised of Ru or Rh.

21. A method for fabricating a magnetic head as described in claim 20 wherein said barrier layer is comprised of Ru and has a thickness of from approximately 5 Å to approximately 40 Å.

22. A method for fabricating a magnetic head as described in claim 21 wherein said barrier layer is formed with a thickness of approximately 20 Å.

* * * * *